United States Patent
Salinas et al.

(10) Patent No.: US 8,092,852 B2
(45) Date of Patent: Jan. 10, 2012

(54) SYSTEMS AND METHODS FOR PRODUCING REDUCED CHOLESTEROL DAIRY PRODUCTS

(75) Inventors: I. Edward Salinas, Racine, WI (US); Eduardo Segovia, Los Pino (MX)

(73) Assignee: I. Edward Salinas, Racine, WI (US)

(*) Notice: Subject to any disclaimer, the term of this patent is extended or adjusted under 35 U.S.C. 154(b) by 734 days.

(21) Appl. No.: 12/145,925

(22) Filed: Jun. 25, 2008

(65) Prior Publication Data

US 2009/0285962 A1    Nov. 19, 2009

Related U.S. Application Data

(60) Provisional application No. 61/053,434, filed on May 15, 2008.

(51) Int. Cl.
*A23C 1/00* (2006.01)

(52) U.S. Cl. ........ 426/491; 426/417; 426/570; 426/586; 426/495; 426/330.2; 426/519

(58) Field of Classification Search ............... 426/570, 426/491, 564, 586, 495, 330.2, 519, 417
See application file for complete search history.

(56) References Cited

U.S. PATENT DOCUMENTS

| | | | |
|---|---|---|---|
| 3,717,474 A | 2/1973 | Fioriti et al. | |
| 4,333,959 A | 6/1982 | Bracco et al. | |
| 4,997,668 A | 3/1991 | Johnson et al. | |
| 5,326,579 A | 7/1994 | Richardson et al. | |
| 5,370,890 A | 12/1994 | Sundfeld et al. | |
| 5,378,487 A * | 1/1995 | Merchant et al. | 426/580 |
| 5,490,999 A * | 2/1996 | Villagran et al. | 426/633 |
| 5,928,702 A * | 7/1999 | Lidman et al. | 426/580 |
| 5,935,632 A * | 8/1999 | Larsen | 426/522 |
| 6,110,517 A * | 8/2000 | Kwak et al. | 426/330.2 |
| 7,258,886 B2 | 8/2007 | Brue et al. | |
| 2002/0034562 A1 | 3/2002 | Sundram et al. | |
| 2002/0119238 A1 | 8/2002 | Pires | |
| 2006/0019008 A1* | 1/2006 | Hruschka et al. | 426/490 |

OTHER PUBLICATIONS

Food Industries manaul NPL, Food industries manual, M.D. Ranken, 24th edition, Leatherhead Food Reasearch Association, 1997, p. 89.*
International Preliminary Report on Patentability for Intl. Pat. Appln. No. PCT/US2009/043621, mailed on Nov. 25, 2010.
Bradley R. L. Jr., "Removal of Cholesterol from Milk Fat Using Supercritical Carbon Dioxide," Journal of Dairy Science, vol. 72, No. 10 (1989).
Ahn, et al., "Cholesterol Removal from Homogenized Milk with β-Cyclodextrin," Journal of Dairy Science, vol. 82, No. 11 (1999).
Kim, et al., "Crosslinking of β-Cyclodextrin on Cholesterol Removal from Milk," Archives Pharmacal Research, vol. 27, No. 11: 1183-1187 (2004).

(Continued)

*Primary Examiner* — Drew Becker
*Assistant Examiner* — Preston Smith
(74) *Attorney, Agent, or Firm* — Foley & Lardner LLP

(57) ABSTRACT

A reduced cholesterol cream, as compared to a conventionally prepared cream, is produced by pressurizing and shearing whole milk prior to separation of the whole milk into skim milk and cream. The skim milk is increased in cholesterol content and the cream is reduced in cholesterol content.

22 Claims, 2 Drawing Sheets

OTHER PUBLICATIONS

Shim, et al., "Functional Properties of Cholesterol-Removed Whipping Cream Treated by β-Cyclodextrin," Journal of Dairy Science, vol. 86, No. 9 (2003).
Boudreau, et al., "Cholesterol Reduction and Fat Fractionation Technologies for Milk Fat: An Overview," Journal of Dairy Science, vol. 76, No. 6 (1993).
International Search Report and Written Opinion for PCT/US2009/043621 mailed Dec. 30, 2009.
International Preliminary Report on Patentability for Intl. Pat. Appln. No. PCT/US2009/002779, dated Aug. 6, 2010, 9 pp.
International Search Report and Written Opinion for Intl. Pat. Appln. No. PCT/US2009/002779, mailed on Jun. 12, 2009, 8 pp.
Jensen, Robert G., "Invited Review: The Composition of Bovine Milk Lipids: Jan. 1995 to Dec. 2000," *Journal of Dairy Science*, vol. 85, pp. 295-350 (2002).
Lee, et al., "Cholesterol Removal from Homogenized Milk with β-Cycoldextrin," Journal of Dairy Science, vol. 82, pp. 2327-2330 (1999).
Non-Final Office Action for U.S. Appl. No. 12/151,392, mailed on May 11, 2011, 17 pp.
EP Communication issued in European Patent Application No. 09743030.0 and dated Sep. 15, 2011.
Notice of Allowance issued in U.S. Appl. No. 12/151,392 and mailed Sep. 26, 2011.

* cited by examiner

SYSTEMS AND METHODS FOR PRODUCING REDUCED CHOLESTEROL DAIRY PRODUCTS

CROSS-REFERENCE TO RELATED APPLICATIONS

This application claims the benefit of U.S. Provisional Application Ser. No. 61/053,434, filed on May 15, 2008, and which is incorporated herein by reference, in its entirety, for any and all purposes.

FIELD

The present invention relates generally to systems and methods utilized in fluid processing operations and more specifically to systems and methods for reducing cholesterol in a milk product, where the milk product may have a selective fat content.

BACKGROUND

Physicians and health experts generally agree that a diet low in saturated fats and cholesterol can reduce the likelihood of heart and circulatory diseases. Consumer awareness of the health benefits associated with maintaining a diet low in fat and cholesterol has increased, along with the demand for food products low in these components. Because of its low fat content, skim milk currently has large applications in such low fat food products.

Whole milk is a dilute emulsion combined with a colloidal dispersion in which the continuous phase is a solution. Whole milk has a fat content typically between about 3.3% to about 3.4%, and about 14 mg of cholesterol per 100 g milk.

In milk products, the majority of the fat, and about 80% to about 85% of the total cholesterol is present in the cream. The cream is predominantly milk fat globules. In the milk fat, the cholesterol is thought to be distributed between the milk fat globule membrane and the bulk lipid. It was once believed that when the membrane was separated from the milk fat globules and the butter oil was isolated from the milk fat globules, that about 90 percent or greater of the cholesterol was equilibrated in the butter oil and about 5 percent or greater was in the membrane. Thus, it was believed that there was a high correlation between fat content and the amount of cholesterol in milk. However, it is now believed that there is very little connection between cholesterol content and fat content. The cream is rich in cholesterol: 100 g of cream with a fat content of 36% contains approximately 125 mg of cholesterol. The USDA National Nutrient Database for Standard Reference lists whipping cream (100 g) with a 37% fat content as containing 137 mg cholesterol.

Skim milk is typically obtained by centrifugation of whole milk to separate the cream from the continuous phase, or skim milk. Upon centrifuging, the cream, an oil rich phase, separates and floats on top of the skim milk. The skim milk thus obtained, contains about 2 mg of cholesterol per 100 g of skim milk, less than about 0.5% fat, and about 10% solids. Thus, the skim milk contains about 10% to about 20% of the total cholesterol content of whole milk.

The cholesterol in milk products is thought to be associated with triglycerides, milk fat globules and complex proteins. Cholesterol in skim milk is thought to exist in three forms as being complexes with:
 (i) residual triglyceride droplets not removed in the skimming process;
 (ii) lipoprotein particles sloughed off from milk fat globule membranes in the skimming process; and
 (iii) proteins contained in the serum albumin.

When skim milk, reduced-fat, or whole milk is concentrated, its cholesterol content increases proportionally. For example, nonfat dry milk has a cholesterol content of about 20-30 mg per 100 grams. Therefore, the use of skim milk, reduced-fat or whole milk as an ingredient in low fat foods can contribute significant amounts of cholesterol to these foods.

Several approaches have been utilized for removing the cholesterol from milk fats. For instance, methods of removing cholesterol from fats by contacting with adsorbent materials such as silica gel and activated carbon. When applied to milk products, such adsorbents have been found to either be too impractical for commercial use or to lack specificity for cholesterol adsorption. Supercritical extraction processes have also been used; however, such processes involves extreme process conditions and is generally too expensive for large commercial applications. Also, the use of oils as extractants of cholesterol from milk have also been used. However, the use of such non-dairy additives does not allow for the dairy products to be sold as an unadulterated product.

SUMMARY

In one aspect, a method of preparing a reduced cholesterol cream is provided. Some embodiments include pressurizing whole milk, shearing the pressurized whole milk, and separating the sheared whole milk into the reduced cholesterol cream and a skim milk, where the method is performed without the addition of non-dairy additives. In some embodiments, the method is conducted at ambient temperature. The separated cream is reduced in cholesterol when compared to a cream prepared without pressurizing and shearing. The separated skim milk is increased in cholesterol when compared to a skim milk prepared without pressurizing and shearing.

In some embodiments, the method is conducted at about 60° F. to 190° F. In other embodiments, the method is conducted at about 80° F. to 130° F. In other embodiments, the method is conducted at about 90° F. to 130° F. In still other embodiments, the method is conducted at about 105° F. In still other embodiments, the whole milk is heated to about 167° F. prior to shearing.

In some embodiments, the whole milk is pressurized from about 200 psi to 2400 psi. In other embodiments, the whole milk is pressurized from about 400 psi to 1800 psi.

In some embodiments, the shearing is performed with a homogenizer, a shear mixer, a shear pump, a colloid mill, ultrasonic processing, or other shearing device known to those of skill in the art. The shearing, with a Colloid mill, can be done using a clearance from about 0.01 inches to 0.24 inches, according to some embodiments. According to other embodiments the clearance is from about from 0.01 to 0.21 inches. In the case of the use of a homogenizer, the shearing is done at a pressure from about 300 to 2100 psi, using one or two valves. In other embodiments, the pressure is from about 600 to 1200 psi, using one or two valves. In some embodiments, the method includes a hold time prior to the separating. In other embodiments, the method includes a hold time prior to the shearing. The optional hold times may range from about 1 minute to 1 hour.

In some embodiments, the sheared whole milk has an average particle size of about 0.04 microns to 0.10 microns.

In some embodiments, 100 g of the separated cream, having a fat content of about 36%, contains from about 40 mg to 110 mg cholesterol. In other embodiments, 100 g of the skim milk contains from about 3 mg to 7 mg cholesterol.

In another aspect, the reduced cholesterol cream prepared by the above methods, is provided.

In another aspect, a reduced cholesterol cream that is 100% free of non-dairy additives, is provided. In some embodiments, the reduced cholesterol cream has a cholesterol content of from about 40 mg to 110 mg cholesterol per 100 g of cream having a 36% fat content. In some such embodiments, the non-dairy additives are oils, carbon dioxide, cyclodextrins, sugars, silica, or carbonaceous materials.

DETAILED DESCRIPTION

The present invention will be understood more readily by reference to the following detailed description, to enable those skilled in the art to practice the many embodiments. It is to be understood that the detailed description is merely an exemplification of all such embodiments, and which are provided by way of illustration and are not intended to be limiting of the present invention, and which may be embodied in other specific structures.

Figure 1:
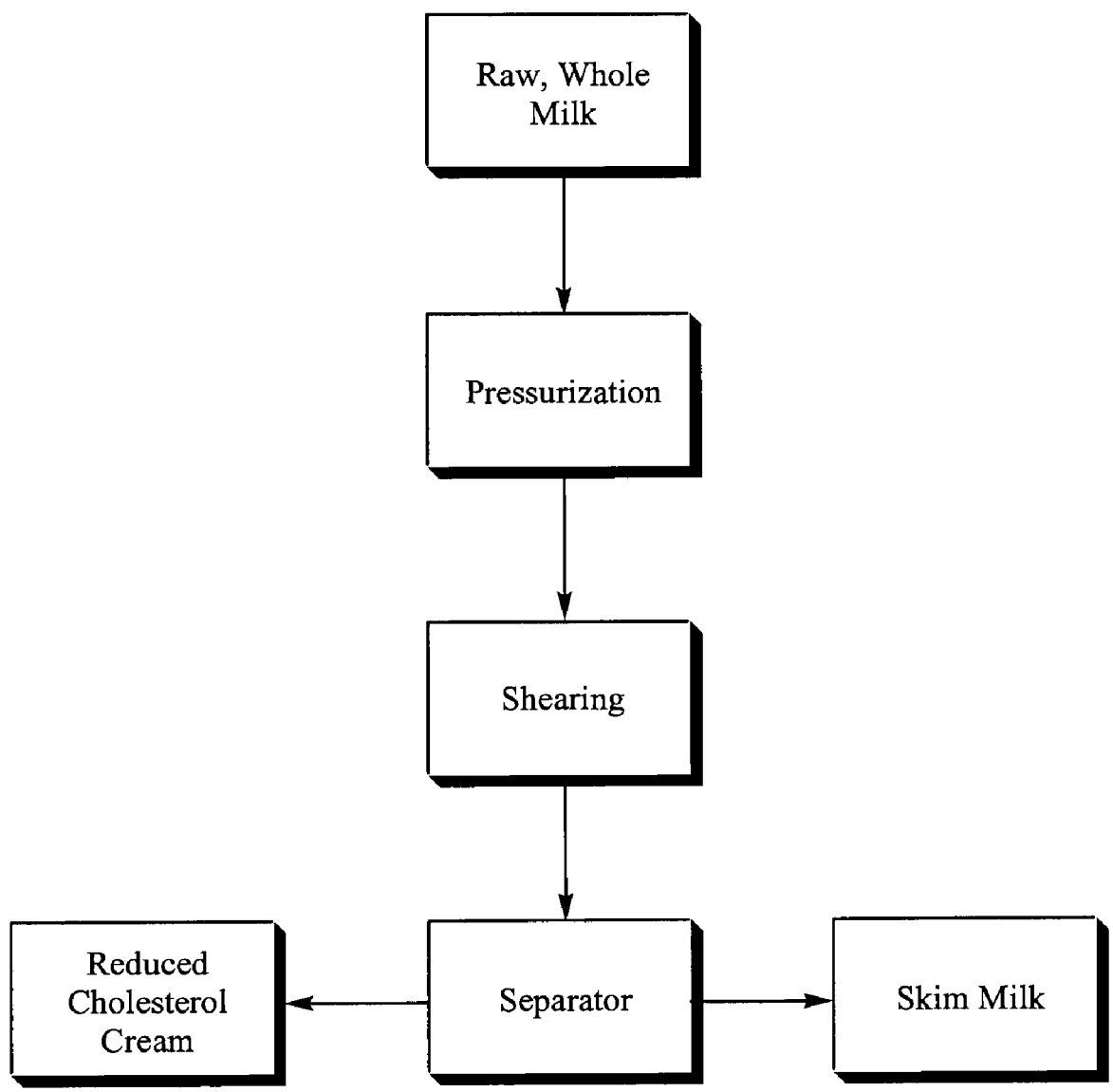
FIG. 1 is a flow chart of a process for reducing the cholesterol content of a cream, according to one embodiment.

Methods of preparing a reduced cholesterol cream, without additives are provided. Overall, the raw whole milk, or previously processed skim milk, is pressurized and sheared to free the cholesterol for dissolution in the skim milk. As noted above, the cholesterol in milk products is associated with triglycerides, milk fat globules and complex proteins. The shearing process breaks up such associations and frees the cholesterol for extraction by the skim milk. After shearing, the milk is separated into a reduced cholesterol cream and a skim milk that is increased in cholesterol content. Such methods are generally described by the flow chart as shown in FIG. 1.

Figure 2:
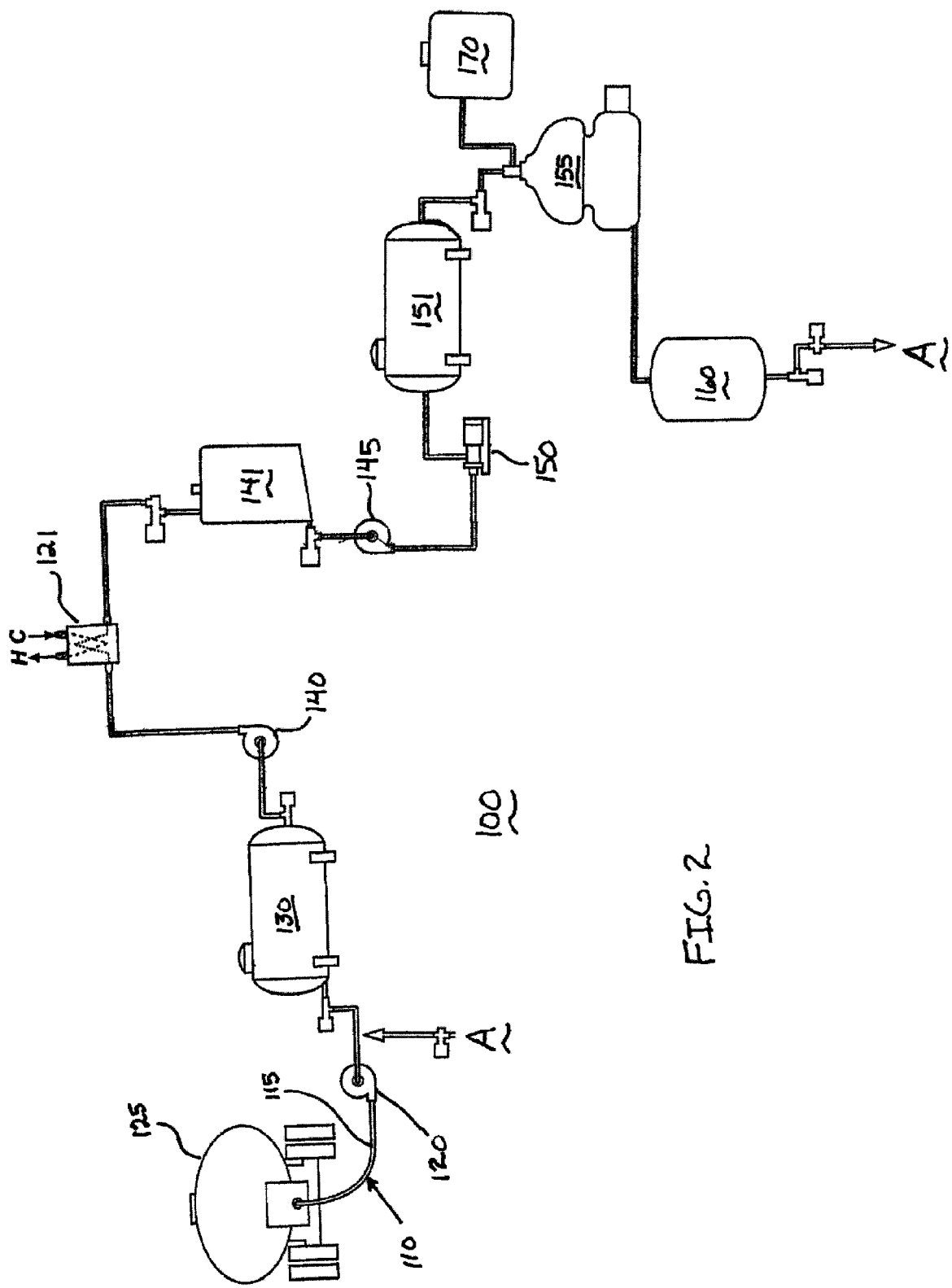
FIG. 2 is a diagram of a process for reducing the cholesterol content of a cream, according to one embodiment.

The method may be more fully described by reference to FIG. 2, generally describing a system 100 for performing the method. The system 100 is preferably generally controlled by a programmable logic controller (PLC) that is programmable or otherwise interactive through a human machine interface (HMI), which may be provided on a touch-screen panel. Before initiating the processing of a quantity of raw whole milk 110 that has been received, the PLC may require some programming input from a system operator. For instance, the operator may program the PLC with the whole milk batch size to be processed. Other parameters will be discussed throughout the remaining description.

Depending on the implementation of the system 100, some manual swing connections may be required to establish desired or required fluid flow paths. For instance, flowverter panels may be used to direct fluid flow. Flowverter panels may be used, for example, to insert or remove optional equipment from the fluid flow circuit. Once the manual swing connections have been made, if needed, the generally automated process may begin.

The method generally begins after whole milk 110, which may be raw, is received. The raw whole milk 110 is delivered to a processing site having a receiving capacity, the size of which is determined by the processing equipment available and can be conducted on a scale as small as a few hundred milliliters or less in the laboratory on up to tanker truckloads of milk that may be as high as, or in excess of, 3000 gallons. A delivery vessel 125, i.e. a tanker truck, is preferably coupled to a receiving pump 120, which conveys the raw whole milk 110 from the delivery vessel 125 to a receiving tank 130. A flowmeter (not shown) may be installed in the flow path from the delivery vessel 125 to the receiving tank 130 to monitor the amount of product pumped into the tank 130 to assist in preventing overflow. A level transmitter (not shown) may be operatively coupled to the receiving tank 130 to provide an overflow or desired level emergency alert, or also to assist in preventing an overflow condition. Upon completion of receiving the raw whole milk 110, the receiving line 115 may be air blown by way of an air blow check valve and an air solenoid valve, which reside generally at opposite ends of the receiving line 115. Alternatively, rather than receiving raw whole milk 110, the process may begin by receiving skim milk. Generally, the raw whole milk 110, or other supplied skim, is received into the receiving tank 130, which may keep the delivered product at a desired temperature. Typically, the received product is stored at cooler temperatures until used in the method. Such cooler temperatures are typically approximately 40° F.

After the delivery of raw whole milk 110, the method begins by pressurizing the raw whole milk 110 using a pressure pump 140 and tank 141. The pressurized whole milk may be pumped by a pump 145, which may be a positive pump, to a shearing device 150, such as a colloid mill. Other shearing or blending devices could be used, such as a shear pump, a hydroshear device, ultrasonic processor, or even a homogenizer. The shearing device 150 is used to shear the whole milk 110 to, at least in part, rupture fat globules and fat globule membranes, to release cholesterol contained within those structures.

Alternatively, the raw whole milk 110, may be heated prior to, or during, any point in the process, including pressurization, shearing, and/or separation. Heating of the whole milk 110 may be optionally performed by flowing through a whole milk heat exchanger 121, thereby creating a heated whole milk. The raw whole milk 110 may be heated to any desirable temperature that will maintain the integrity of the raw whole milk 110. For example, the temperatures may range from about 60° F. to 190° F., from about 70° F. to 180° F., from about 80° F. to 170° F., from about 90° F. to 170° F., from about 95° F. to 110° F., or from about 150° F. to about 180° F. In some embodiments, the temperature is about 105° F. In other embodiments, the temperature is about 167° F. Typically, the heating requires a hold time, or rest period, in the heat exchanger 121. Such a hold time, or rest period, may vary from about 1 second to 120 seconds, from about 5 seconds to about 90 seconds, or from about 10 seconds to 60 seconds.

Heating or pretreatment of the whole milk 110 prior to pressurization, shearing, and/or separating may depend upon the type of shearing equipment or separating equipment to be employed, e.g., a homogenizer, a shear mixer, a colloid mixer, a centrifugal separator, a membrane filtration unit, or other such types of equipment. The heating may be performed before pressurization, shearing, and/or separating and some or all of the pieces of equipment that perform the pressurizing, shearing, separating, and/or tubing or piping through which the milk is transferred may be jacketed or insulated to prevent heat loss. As the milk heat exchanger 121 is optional, some embodiments do not include this device.

After shearing, the sheared milk is separated in a separator 155 to an increased cholesterol skim milk held in a vessel 160 and a reduced cholesterol cream held in a vessel 170, both of which may be processed individually to various end products. For example, the reduced cholesterol cream, may be used to prepare reduced cholesterol creams such as acidified, fermented, whipping, or sour creams, etc.; cheeses; yogurts; ice creams; butters; butter blends; and the like. The reduced cholesterol creams may also be remixed with skim milk with a lower cholesterol content, such as that produced by conventional skimming processes, to produce dairy products suitable for a wide range of applications, but which are none the less reduced in cholesterol when compared to conventionally prepared dairy products. For example, the reduced cholesterol cream may be mixed with other fluid milks to reconstitute a milk product that is reduced in cholesterol. Such milk products can be further pasteurized, made in chocolate or other flavored milks, or used in long-life milk products. The increased cholesterol skim milk may be used as is, or may be subjected to further processing such as by the addition of other agents to aid in cholesterol reduction, or simply reintroduced to the system 100, via optional route A in FIG. 1, to run the process again to produce a second reduced cholesterol cream and a second increased cholesterol skim.

The separation may be conducted either immediately after shearing, or alternatively, a rest period is allowed between shearing and separation. For example where a rest period is allowed, after shearing, but prior to separation, the sheared milk is rested either in the shearing device 150 or in a separate holding tank 151, if desired. Such a rest period allows for the separation phase to begin based upon density differences of the various components of the sheared milk. This rest period can be from about 10 seconds to 120 minutes, from about 1 minute to 90 minutes, from about 10 minute to 90 minutes, or from about 30 minutes to 90 minutes.

Without being bound by theory, it is believed that the portion of the sheared whole milk that will be separated as the skim milk extracts, or at least acts as a repository for the cholesterol that is separated from the cream portion. Therefore, when the separation is conducted, the skim milk has a cholesterol content that is increased, as compared to skim milk that was not treated by the pressurization and shearing, and the cholesterol content of the cream is reduced, as compared to cream that was not treated by the pressurization and shearing.

The amount of reduction of cholesterol in the cream is dependent upon the method parameters. For example, the pressurization, heating temperature, shear rate, flow rate, rest period, and centrifugation speed can all impact the exact amount of cholesterol reduction in the cream. In one embodiment, about 20% to 40% of the available cholesterol is removed by the skim milk in a single iteration of the method. Additional iterations with the skim milk recovered from the first iteration may be conducted to further reduce the amount of cholesterol in the cream, but with diminishing returns. For example, subsequent iterations may only reduce the cholesterol content of the cream by about 5% to 20%. Cream separated from whole milk under conventional methods has about 125 mg of cholesterol per 100 g of cream having a 36% fat content. Thus, in some embodiments, the reduced cholesterol cream has about 40 mg to 110 mg cholesterol per 100 g of cream having a 36% fat content. In other embodiments, the cholesterol content of a reduced cholesterol cream having a 36% fat content is about 50 mg to 90 mg, about 60 mg to 80 mg, about 40 mg to 90 mg, about 50 mg to 110 mg, about 40 mg to 80 mg, or about 50 mg to 100 mg. In various embodiments, the amount of cholesterol in 100 g of a reduced cholesterol cream having a 36% fat content is 120 mg or less, 115 mg or less, 110 mg or less, 105 mg or less, 100 mg or less, 95 mg or less, 90 mg or less, 85 mg or less, 80 mg or less, 75 mg or less, 70 mg or less, 65 mg or less, 60 mg or less, 55 mg or less, 50 mg or less, 45 mg or less, or 40 mg or less.

The reduced cholesterol cream produced by the above methods is a 100% dairy product, that is unadulterated by the addition of non-dairy additives. While other reduced cholesterol creams are known, non-dairy additives are introduced, thereby adulterating the cream to not qualify as a dairy product. Thus, in some embodiments, a reduced cholesterol cream is provided that is 100% free of non-dairy additives.

The cholesterol content in skim milk, produced via conventional methods (i.e. no pressurization or shearing prior to separation) is about 2 mg per 100 g of skim milk. After a single iteration of the method, the cholesterol content of 100 g of skim milk is 3 mg or greater, according to some embodiments. According to other embodiments, the cholesterol content of 100 g of skim milk, increased in cholesterol content by the above method, is 3.5 mg or greater, 4 mg or greater, 4.5 mg or greater, 5 mg or greater, 5.5 mg or greater, 6 mg or greater, 6.5 mg or greater, 7 mg or greater, 7.5 mg or greater, 8 mg or greater, 8.5 mg or greater, or 9 mg or greater. Thus, in some embodiments, the cholesterol content of the increased cholesterol skim milk is from about 3 mg to 9 mg. In other various embodiments, the cholesterol content of the increased cholesterol skim milk is from about 3 mg to 8 mg, from about 3 mg to 7 mg, from about 3 mg to 6 mg, from about 4 mg to 9 mg, from about 4 mg to 8 mg, from about 4 mg to 7 mg, or from about 4 mg to 6 mg.

Whipping cream is an example of a product that may be prepared from the separated cream. As noted above, 100 ml whipping cream with a 37% fat content, prepared from conventionally prepared cream has a cholesterol content of about 137 mg. In comparison, whipping cream prepared by the above methods has a cholesterol content of about 50 mg to 115 mg, in some embodiments, and from about 80 mg to about 110 mg, in other embodiments.

As the amount of cholesterol in the raw whole milk is relatively constant within milk supply samples, an increase in the cholesterol content of the skim milk prepared by the above methods is accompanied by a concomitant reduction in cholesterol content of the cream. As such, in some embodiments, a sample of the reduced cholesterol cream (100 g), prepared by the above methods, contains less cholesterol, than a conventional process where pressurization and shearing of the milk prior to separation are not performed.

For the purposes of this disclosure and unless otherwise specified, "a" or "an" means "one or more."

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The processes and products illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Additionally the phrase "consisting essentially of" will be understood to include those elements specifically recited and those additional elements that do not materially affect the basic and novel characteristics of the claimed invention. The phrase "consisting of" excludes any element not specifically specified.

One skilled in the art will readily realize that all ranges discussed can and do necessarily also describe all subranges therein for all purposes and that all such subranges also form part and parcel of this invention. Any listed range can be easily recognized as sufficiently describing and enabling the same range being broken down into at least equal halves, thirds, quarters, fifths, tenths, etc, in any portion of the range. As a non-limiting example, each range discussed herein can be readily broken down into a lower third, middle third and upper third, etc.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present invention, thus generally described, will be understood more readily by reference to the following examples, which are provided by way of illustration and are not intended to be limiting of the present invention.

EXAMPLES

In conventional methods, raw, non-treated milk passed trough a cream separator produces skim milk and cream. The cholesterol content of skim milk prepared by this conventional process is typically about 2 mg per 100 g of skim milk. The use of varying pressurization of the raw, non-treated milk, and shearing protocols can change the amount of cholesterol present in the skim milk (i.e. an increase of the cholesterol content of the skim is balanced by a decrease in cholesterol content of the cream).

Example 1

Raw whole milk (200 gal) was warmed to 105° F. The whole milk was then pump at ambient pressure through a Waukesha colloid mill, adjusted to 0.01 inches, to shear the milk. The sheared milk was then immediately separated in a milk separator, producing a reduced cholesterol cream and an increased cholesterol skim milk. The increased cholesterol skim milk (100 g) had a cholesterol content of about 3.48 mg.

Example 2

Raw whole milk (50 gal) was warmed to 105° F. The whole milk was then pumped to a Gaulin milk homogenizer using pressure settings of 200+200 psi, at the first and second valves, respectively, and then pumped through a colloid mill adjusted to 0.01 inches. The homogenized, milled milk was then immediately separated in a milk separator thereby producing a reduced cholesterol cream and an increased cholesterol skim milk. The increased cholesterol skim milk (100 g) had a cholesterol content of about 4.18 mg.

Example 3

Raw whole milk (50 gal) was warmed to 105° F. The whole milk was then pumped to a Gaulin milk homogenizer using pressure settings of 300+300 psi, at the first and second valves, respectively, and then pumped through a colloid mill adjusted to 0.01 inches. The homogenized, milled milk was then immediately separated in a milk separator thereby producing a reduced cholesterol cream and an increased cholesterol skim milk. The increased cholesterol skim milk (100 g) had a cholesterol content of about 4.90 mg.

Example 4

Raw whole milk (50 gal) was warmed to 105° F. The whole milk was then pumped to a Gaulin milk homogenizer using pressure settings of 400+400 psi, at the first and second valves, respectively, and then pumped through a colloid mill adjusted to 0.01 inches. The homogenized, milled milk was then immediately separated in a milk separator thereby producing a reduced cholesterol cream and an increased cholesterol skim milk. The increased cholesterol skim milk (100 g) had a cholesterol content of about 6.32 mg.

Example 5

Raw whole milk (50 gal) was warmed to 105° F. The whole milk was then pumped to a Gaulin milk homogenizer using pressure settings of 500+500 psi, at the first and second valves, respectively, and then pumped through a colloid mill adjusted to 0.01 inches. The homogenized, milled milk was then immediately separated in a milk separator thereby producing a reduced cholesterol cream and an increased cholesterol skim milk. The increased cholesterol skim milk (100 g) had a cholesterol content of about 6.000 mg.

While one embodiment has been illustrated and described, it should be understood that changes and modifications can be made therein in accordance with ordinary skill in the art without departing from the invention in its broader aspects as defined in the following claims.

What is claimed is:

1. A method of preparing a reduced cholesterol cream comprising:
    pressurizing whole milk;
    shearing the pressurized whole milk;
    separating the sheared whole milk into the reduced cholesterol cream and a skim milk;
    wherein the method is performed without the addition of non-dairy additives.

2. The method of claim 1 conducted at ambient temperature.

3. The method of claim 1 conducted at about 60° F. to 190° F.

4. The method of claim 3 conducted at about 80° F. to 170° F.

5. The method of claim 3 conducted at about 90° F. to 170° F.

6. The method of claim 3 conducted at about 105° F.

7. The method of claim 3 conducted at about 167° F.

8. The method of claim 1, wherein the whole milk is pressurized from about 200 psi to 2400 psi.

9. The method of claim 1, wherein the whole milk is pressurized from about 400 psi to 1800 psi.

10. The method of claim 1, wherein the shearing is performed at a rate of about 0.01 to 0.24 inches of clearance.

11. The method of claim 1, wherein the shearing is performed with a homogenizer, a shear mixer, a shear pump, an ultrasonic processor, or a colloid mill.

12. The method of claim 1 further comprising a hold time prior to the separating.

13. The method of claim 12, wherein the hold time is from about 1 minute to 1 hour.

14. The method of claim 1, wherein the whole milk is heated to about 30° F. to 190° F. prior to shearing.

15. The method of claim 1, wherein the whole milk is heated to about 167° F. prior to shearing.

16. The method of claim 1, wherein the sheared whole milk comprises a particle size of about 0.04 microns to 0.10 microns.

17. The method of claim 1, wherein the separated cream is reduced in cholesterol when compared to a cream prepared without pressurizing and shearing.

18. The method of claim 1, wherein the separated skim milk is increased in cholesterol when compared to a skim milk prepared without pressurizing and shearing.

19. The method of claim 1 further comprising repeating the method with the skim milk comprising:

pressurizing the skim milk;
shearing the skim milk;
separating the sheared skim milk into a second cream and a second skim milk.

20. The method of claim 1, wherein the non-dairy additives are oils, carbon dioxide, cyclodextrins, sugars, silica, or carbonaceous materials.

21. The method of claim 1, wherein 100 g of the separated cream, having a fat content of about 36%, contains from about 40 mg to 110 mg cholesterol.

22. The method of claim 1, wherein 100 g of the skim milk contains from about 3 mg to 7 mg cholesterol.

* * * * *